(12) United States Patent
Hübinger et al.

(10) Patent No.: US 6,875,406 B1
(45) Date of Patent: Apr. 5, 2005

(54) COUNTERFLOW STRIPPING TUBE (75) Inventors: Wolfgang Hübinger, Limburgerhof (DE); Günter Staufer, Hochdorf-Assenheim (DE); Peter Keller, Hirschberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/806,486

(22) PCT Filed: Oct. 12, 1999

(86) PCT No.: PCT/EP99/07639
§ 371 (c)(1),
(2), (4) Date: Apr. 12, 2001

(87) PCT Pub. No.: WO00/21632
PCT Pub. Date: Apr. 20, 2000

(30) Foreign Application Priority Data

Oct. 13, 1998 (DE) .......................... 198 47 115

(51) Int. Cl.[7] .................................. B01J 8/04
(52) U.S. Cl. ...................... 422/144; 422/191; 422/193; 422/188; 422/236; 422/239
(58) Field of Search ................ 422/144, 188, 422/193, 236, 190, 191, 237, 239

(56) References Cited

U.S. PATENT DOCUMENTS 1,749,266 A * 3/1930 Sontag ................... 261/113
2,939,771 A 6/1960 McDonald et al. ........ 422/255
3,928,513 A 12/1975 Leva ........................ 261/113
5,942,197 A * 8/1999 Gupta et al. ............... 422/191

FOREIGN PATENT DOCUMENTS

| CH | 562 046 | 5/1975 |
| DE | 12 48 943 | 8/1967 |
| DE | 15 19 672 | 1/1971 |
| DE | 1 519 672 | 1/1973 |
| WO | WO 97/45184 | 12/1997 |

* cited by examiner

Primary Examiner—Kiley S. Stoner
Assistant Examiner—Len Tran
(74) Attorney, Agent, or Firm—Oblon, Spivak, McClelland, Maier & Neustadt, P.C.

(57) ABSTRACT

Countercurrent stripping pipe for removing volatile organic constituents from reaction products, having a column pipe (201) composed of a plurality of pipe sections (201*a–d*), in which trays (202) are arranged, connections (205, 208) for supplying and removing the reaction products and connections (206, 207) for supplying and removing at least one stripping agent in countercurrent to the reaction products. In accordance with the invention, a plurality of successive trays (202) in each case are joined to one another and form at least two inserts (211*a–c*) which can be removed from the column pipe (201).

30 Claims, 8 Drawing Sheets

COUNTERFLOW STRIPPING TUBE

CONTINUING APPLICATION DATA

The present application is a 371 of International Application No. PCT/EP99/07639, filed on Oct. 12, 1999.

The present invention relates to a countercurrent stripping pipe for removing volatile organic constituents from reaction products, especially from polymer solutions and polymer dispersions.

In the course of production processes in the chemical industry, products are formed which still contain unwanted volatile organic components. In the case of polymerization processes, for instance, a very wide variety of impurities may remain in the reaction product, examples being residual monomers resulting from incomplete conversion of the starting materials, saturated, unpolymerizable compounds entrained with the starting materials, and products of low molecular mass originating from secondary reactions. These volatile organic constituents often have a very intense odor and in some cases may even be injurious to health. Polymer dispersions in particular, however, have found numerous applications in which an odor nuisance is inadmissible. As typical of such applications there may be mentioned interior applications, where polymer dispersions are employed, for example, as tile adhesives or carpet adhesives or in film-forming resins. Odorless polymer dispersions are also required by the paper industry, for example, in the form of paper coating dispersions, or in the form of pressure-sensitive adhesive dispersions. Finally, the cosmetics industry, to produce hair gels, for instance, or the textile industry, to produce coating compositions for nonwovens, for instance, makes use of polymer dispersions which are not permitted to have any substantial inherent odor. As a result, for many applications, but especially for interior applications and in the foodstuffs or cosmetics sector, it is necessary to remove residual volatiles from polymers as far as is possible.

For removing the volatile organic constituents from reaction products—for example, from polymer solutions or from aqueous polymer dispersions and suspensions prepared by free-radical polymerization of vinyl-type monomers—deodorization processes have been developed. In addition to chemical processes, which usually affect only the unsaturated compounds, however, use is made predominantly of stripping processes, in which a stripping gas is passed through the suspension or dispersion. Stripping gases employed include air, oxygen, nitrogen, supercritical carbon dioxide, ozone, and water vapor. Also known are processes in which chemical deodorization is followed by a physical deodorization with the aid of a stripping process.

DE-C-12 48 943, for example, describes an apparatus for batchwise removal of odoriferous substances from aqueous polymer dispersions. Here, the dispersion is charged to a vessel and the unwanted components are expelled by introducing steam at the bottom of the vessel.

For larger amounts of dispersions to be treated, continuous column processes are being employed increasingly.

The Applicant's International Patent Application WO 97/45184, for example, describes a column and a process for deodorizing dispersions. Here, the dispersion is treated with steam in a countercurrent column comprising dual-flow trays and/or cross-flow trays, the steam, with a pressure of 0.1–0.7 bar, being introduced into the column in countercurrent to the dispersion. With the countercurrent column described in WO 97/45184 it is possible to simplify the column trays and increase the specific throughput. The known countercurrent columns are produced in one piece, with the trays being subsequently screwed onto welded-in support rings.

A construction of this kind, however, is subject to disadvantages. Since dispersions readily form films and coagulum, frequent cleaning of the trays is required. Since the trays are firmly screwed down in the column and removal of the individual trays is extremely time-consuming, the stripping column has to be provided with a manhole and at least one cleaning aperture per tray. Using such a manhole, an operative is able to clean the associated tray and the adjacent wall areas extending to the next tray, using a high-pressure water jet. In this case it is necessary to operate with water pressures of up to 2000 bar, which is associated with considerable risk to a cleaning operative working within a very confined space. The provision of a manhole necessitates, in addition, a tray spacing of at least 600 mm and a column diameter of about 1 m. For effective separation, this results in column heights of more than 20 m and an internal volume of at least 25 $m^3$. With typically from 25 to 30 trays, this results in complex columns having a total of more than 100 ports, manholes and cleaning covers. These ports and covers are potential dirt traps. The cleaning of the trays in the installed state, as well, proves to be complex and labor intensive. Changing the tray geometry (dual-flow trays or cross-flow trays or trays with a different perforation pattern, for different throughputs) results in column downtime of several weeks.

For deodorizing relatively small batches of product, furthermore, there is the disadvantage that comparatively small volumes of dispersion must be pumped through a relatively large and complex apparatus.

It is an object of the present invention to simplify the construction of the countercurrent column known from WO 97/45184 without detriment to its high specific throughput in order in particular to ensure greater ease of cleaning and of tray replacement. In addition, the apparatus of the invention should also be suitable for deodorizing relatively small batches of product.

We have found that this object is achieved by the countercurrent stripping pipe having the features of the present main claim. Advantageous embodiments of the invention are provided by the subclaims.

The present invention therefore provides a countercurrent stripping pipe for removing volatile organic constituents from reaction products, comprising a column pipe which is composed of a plurality of pipe sections and in which trays are arranged, connections for supplying and removing the reaction products and connections for supplying and removing at least one stripping agent in countercurrent to the reaction products, a plurality of successive trays being connected to one another to form at least two separate inserts which can be removed from the column pipe.

DE 1 519 672 and Swiss Patent CH 562 046 describe fractionating columns having trays connected to form removable inserts. The use of such tray inserts in countercurrent stripping pipes, however, is not disclosed by these documents. Furthermore, said prior art proposes joining all of the trays to form a single insert. The modular design provided in accordance with the invention, with a plurality of inserts, is not described in the prior art.

The countercurrent stripping pipe of the invention combines numerous advantages:

The trays of the stripping pipe can be replaced or removed from the pipe without prolonged plant shutdown. Whereas in the case of conventional stripping columns the individual trays must first be unscrewed from their respective support rings, in the case of the stripping pipe of the invention the complete inserts can be lifted in succession from the pipe. It is therefore possible to clean the inserts outside the pipe, which represents a safety advantage for the cleaning operatives. It is also possible to install inserts held ready as replacements, immediately after the soiled inserts have been removed. This tray changeover requires just a few days' shutdown of the plant, whereas with a comparable conventional countercurrent column the changeover of the fixed trays entails at least a two week downtime period.

In addition, however, this also removes the need to provide a separate manhole and associated cleaning ports for each tray in the stripping pipe of the invention. In contrast to the known stripping columns, therefore, the stripping pipe of the invention, despite a comparable number of trays, is distinguished by a drastic decrease in the number of connection ports. Depending on the embodiment, only about 20 to 30 ports will be present, these being primarily connections for temperature or pressure monitoring means, inspection windows, or connections for taking samples.

This simpler constructional design also facilitates the cleaning of the stripping pipe, since the reduction in the number of ports is accompanied by the omission of many of the poorly accessible and difficult-to-clean regions which are present on the inside of conventional columns.

The simplified design proposed by the invention is also intended to be emphasized by the terminology used here: owing to the few externally visible ports, the countercurrent stripping pipe of the invention really does have the character of a simple "pipe", whereas the known stripping columns, with their numerous ports, covers and connections, have the typical appearance of a tray "column".

In accordance with the invention, the trays can be connected to form inserts in a wide variety of ways. For example, it is possible to screw the trays to one another with the aid of threaded rods. Preferably, however, the trays are welded with the aid of metal connecting plates, which results in particularly stable inserts.

The outer periphery of the inserts may carry guide means, such as rollers or gliding elements, so that they can be lifted out of the stripping pipe with no risk of damage.

The inserts can be fixed in the stripping pipe. With particular preference, however, they are simply placed atop of one another or placed on or hung from suitable mountings in the pipe.

Preferably from 2 to 10 of these inserts are arranged in the column pipe, in which case each insert will then have preferably 3 to 10 trays, more preferably from 4 to 7 trays. Particular preference here is given to 6 trays per insert. With fewer trays per insert the number of inserts required becomes too great, which makes tray removal more complicated again. A greater number of trays per insert makes the individual inserts heavier and more difficult to handle.

The diameter of the trays of an insert advantageously corresponds essentially to the internal diameter of the column pipe and is preferably from 100 to 2500 mm, with particular preference from 500 to 1600 mm. The necessary play between the outer periphery of a tray and the inner wall of the pipe can be compensated by elastic sealing lips which run around the outer periphery of the tray.

The distance between successive trays in an insert can be, for example, from 200 to 1000 mm, preferably from 400 to 600 mm. An insert will then typically have a height of between 2 and 3 meters.

In the case of relatively small embodiments of the apparatus of the invention, the head of the column, which is widened if desired, can be designed so as to be removable. Alternatively, it may have an opening which can be closed by means of a removable cover and whose diameter is sufficient to allow removal through the aperture of the inserts with the aid of a lifting tool.

The column pipe of the invention is composed of two or more pipe sections. Each pipe-section is preferably assigned one insert; in other words, the length of the pipe section and the height of the insert are matched to one another.

In accordance with a first embodiment, the internal diameters of succeeding pipe sections decrease from top to bottom, the internal diameter of a pipe section remaining essentially constant over its length. Arranged in each pipe section, then, is an insert which can be removed through the upper aperture of the column pipe and whose trays have a diameter matched to the corresponding pipe section. By virtue of the upwardly widening stripping pipe, the individual inserts can be removed without risk of jamming.

In this embodiment, the inserts preferably lie on steplike connecting regions between each pair of successive pipe sections, on a widened flange piece, for instance. Alternatively, the inserts may stand on top of one another in the column pipe. This variant is preferred in the case of relatively small columns in particular. In small and compact columns where the individual pipe sections can be separated from one another without problems it is also possible to clamp the individual inserts into the flange connections between the pipe sections.

The column head can be designed as a gravity separator for foam and entrained droplets of liquid. In this case the internal diameter of the head will be greater than that of the column pipe. In its lower region, the column may have an extension of about 1 to 4 meters in length which constitutes the column bottom. The deodorized reaction products are collected in this column bottom. Normally, the column bottom serves as an initial charge for subsequent process stages.

The trays employed can be dual-flow trays and/or cross-flow trays. Trays of this kind and their design are described, for example, in Klaus Sattler, "Thermische Trennverfahren", VCH 1988. Dual-flow trays are particularly preferred here since their construction does not endow them with any dead zones: this first reduces the expense of cleaning and second permits smaller column cross sections. Because of the greater efficiency, it is also possible to reduce the number of trays and thus the column height.

Stripping agents which can be used are preferably gaseous substances such as air, oxygen, nitrogen, supercritical carbon dioxide, and ozone. In the case of the countercurrent stripping pipe of the invention, however, particular preference is given to use of steam as stripping agent. The steam is preferably introduced into the column bottom by way of one or more connection ports and is drawn off at the top of the column. Each of these connection ports preferably has a pneumatically operable valve with a downstream distributor means with which the steam can be introduced into the column bottom through numerous fine orifices.

The reaction products for deodorization are fed in the upper region of the column pipe, preferably in the enlarged head of the column. With particular preference, the reaction products are introduced tangentially into the column head about midway up its vertical extent. By virtue of this measure it is possible to achieve a drastic reduction in foaming.

The apparatus of the invention can be deployed to particular advantage to prepare polymer dispersions or polymer suspensions having a low VOC content (VOC=volatile organic compounds). For a detailed description of the preparation and deodorization of preferred dispersions which can be treated with the countercurrent stripping pipe of the invention, reference may be made to the disclosure content of the Applicant's International Application WO 97/45184, which is expressly incorporated herein by reference.

The countercurrent stripping pipe of the invention is also suitable with particular advantage for replacing the organic solvent of a polymer solution by water.

The present invention is elucidated in more detail below with reference to preferred embodiments depicted in the attached drawings, wherein.

Figure 9:
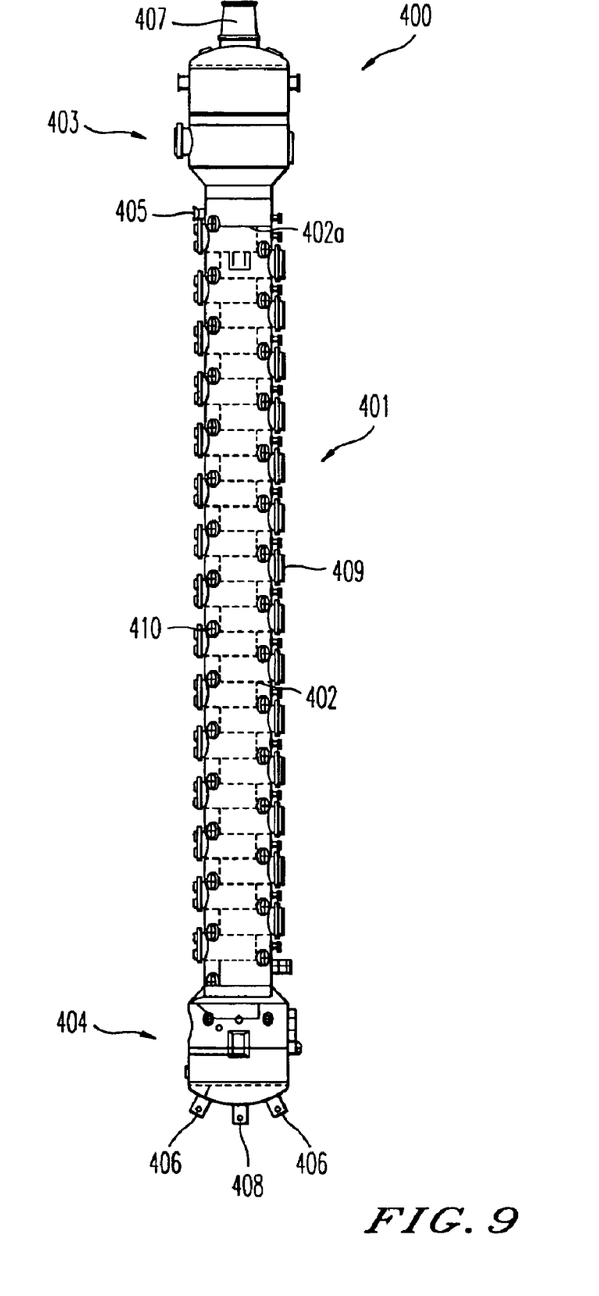
FIG. 9 shows a prior art stripping column.

Referring to FIG. 9, the design of a conventional stripping column will be explained first of all. The known stripping column 400 consists of a column pipe 401 which is manufactured from one piece and in which 30 trays 402 having a diameter of 1500 mm are arranged. The trays are screwed onto support rings (not visible in the drawing) which are welded in the column pipe 401. The stripping column 400 has a widened column top 403 and a likewise widened column bottom 404. Top and bottom each have a diameter of 2300 mm. The overall height of the known stripping column is 26.2 m, with a volume of 57 m³. The dispersion containing residual volatile impurities or a solvent-based polymer solution is passed into the column through an entry port 405 at the height of the topmost column 402a. At the same time, steam is blown in through a plurality of ports 406 at the column bottom 404, and this steam ascends within the column pipe in countercurrent to the dispersion and expels the residual volatiles from the dispersion. In the case of a polymer solution, the organic solvent is driven from the solution and replaced by water. Steam and residual volatiles or organic solvent leave the column 400 via an exit port 407 at the column top 403, said port being under a slight subatmospheric pressure. Efficient mixing of the dispersion or polymer solution with the ascending steam takes place on the trays 402. The decontaminated dispersion or polymer solution with replacement solvent leaves the column at the product outlet 408 in the column bottom 404.

Since dispersions readily form films and coagulum, the trays require frequent cleaning. For this purpose, each tray 402 in the known column is assigned a manhole 409 having a diameter of 500 mm and at least one cleaning port 410, the cleaning port in the present case having a diameter of 200 mm. Through the manhole 409, cleaning operatives are able to clean the associated tray 402 and the wall region of the column pipe 401 that lies directly above said tray 402 using a high-pressure water jet. However, this cleaning procedure is very complex and, because of the water pressures of 2000 bar or more that are used, is dangerous. Furthermore, cleaning is never perfect since the numerous ports on the pipe, in the present case totaling 108, are dirt traps which are virtually impossible to clean thoroughly.

In contrast, the stripping pipe of the invention, which is illustrated below, has a substantially simpler design and permits rapid and thorough cleaning.

Figure 1:
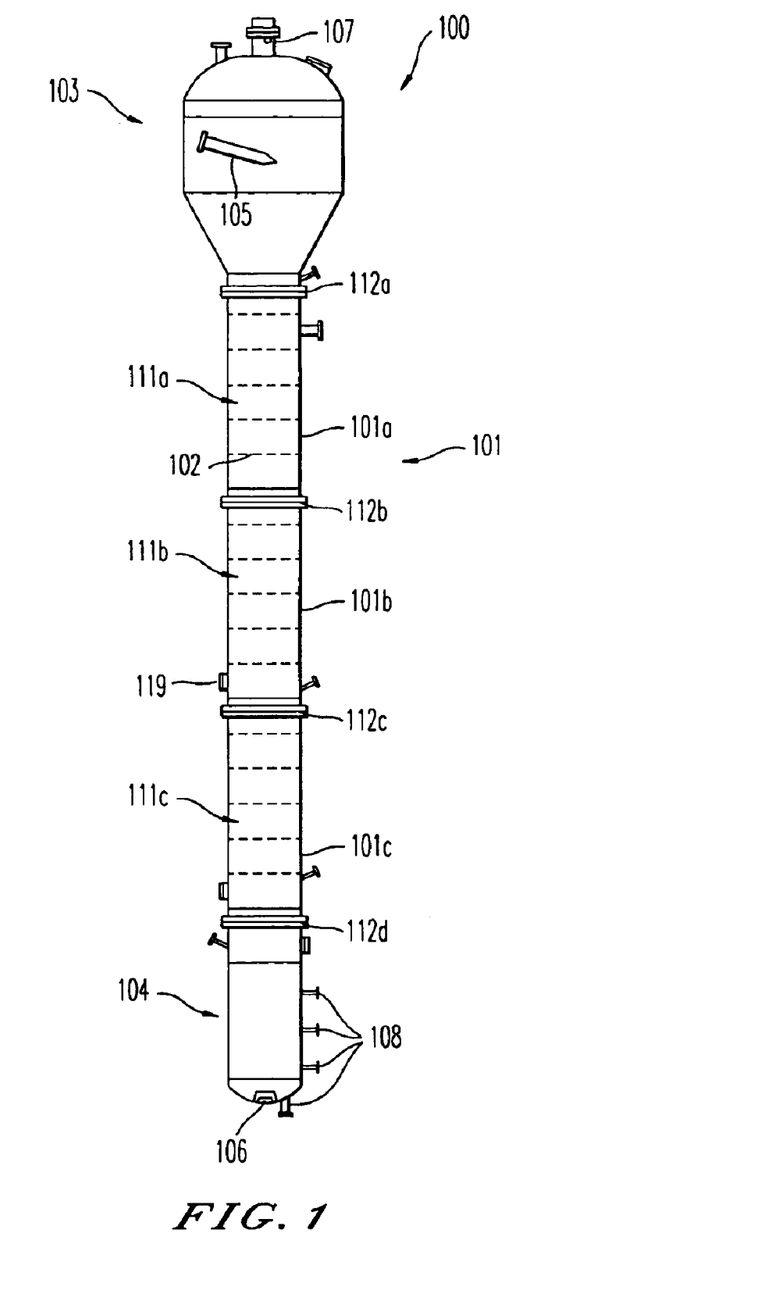
FIG. 1 shows a diagram of a first countercurrent stripping pipe of the invention suitable especially for relatively small batches of product.

A first embodiment of the stripping pipe of the invention is shown in FIG. 1. Even in the diagram of FIG. 1, the stripping pipe 100 of the invention exhibits a substantially simpler design than the conventional stripping column of FIG. 9. This first variant of the invention is used in particular to treat relatively small batches of product. In the column pipe 101, a total of 18 trays 102 having a diameter of 800 mm are arranged. The column top 103 is widened to a diameter of 1800 mm and serves as a separator for entrained droplets of product. The column top also houses the product inlet 105, which in the example depicted emerges tangentially about midway up the vertical extent of the column top. A tangential feed of this kind prevents excessive foaming when, for example, dispersions are being fed in. The polymer solution or dispersion fed in flows downward in the column pipe 101 through the trays 102, while steam fed in in countercurrent in the extended column bottom 104 by way of an entry port 106 is passed upward. Steam and entrained residual volatiles leave the column at the column top 103 via an exit port 107 which is subject to subatmospheric pressure. The stripped dispersion or the polymer solution freed from the organic solvent leaves the stripping pipe 100 by way of one or more product outlets 108 provided laterally at the column bottom.

In contrast to the prior art, the column pipe 101 of the stripping pipe of the invention is composed of a plurality— in the example of FIG. 1, a total of three—pipe sections 101a, 101b and 101c. In the present case, the three pipe sections have the same internal diameter.

Groups of six trays 102 are brought together to form inserts 111a, 111b and 111c. In contrast to the prior art stripping columns, the trays 102 are not fixed to the column pipe but instead are designed as removable inserts. In the example depicted, precisely one insert 111a or 111b or 111c, respectively, is assigned to each pipe section 101a–10c. The individual pipe sections are connected to one another, to the column top 103 and the column bottom 104, respectively, by means of flange connections 112a–112d.

Figure 2:
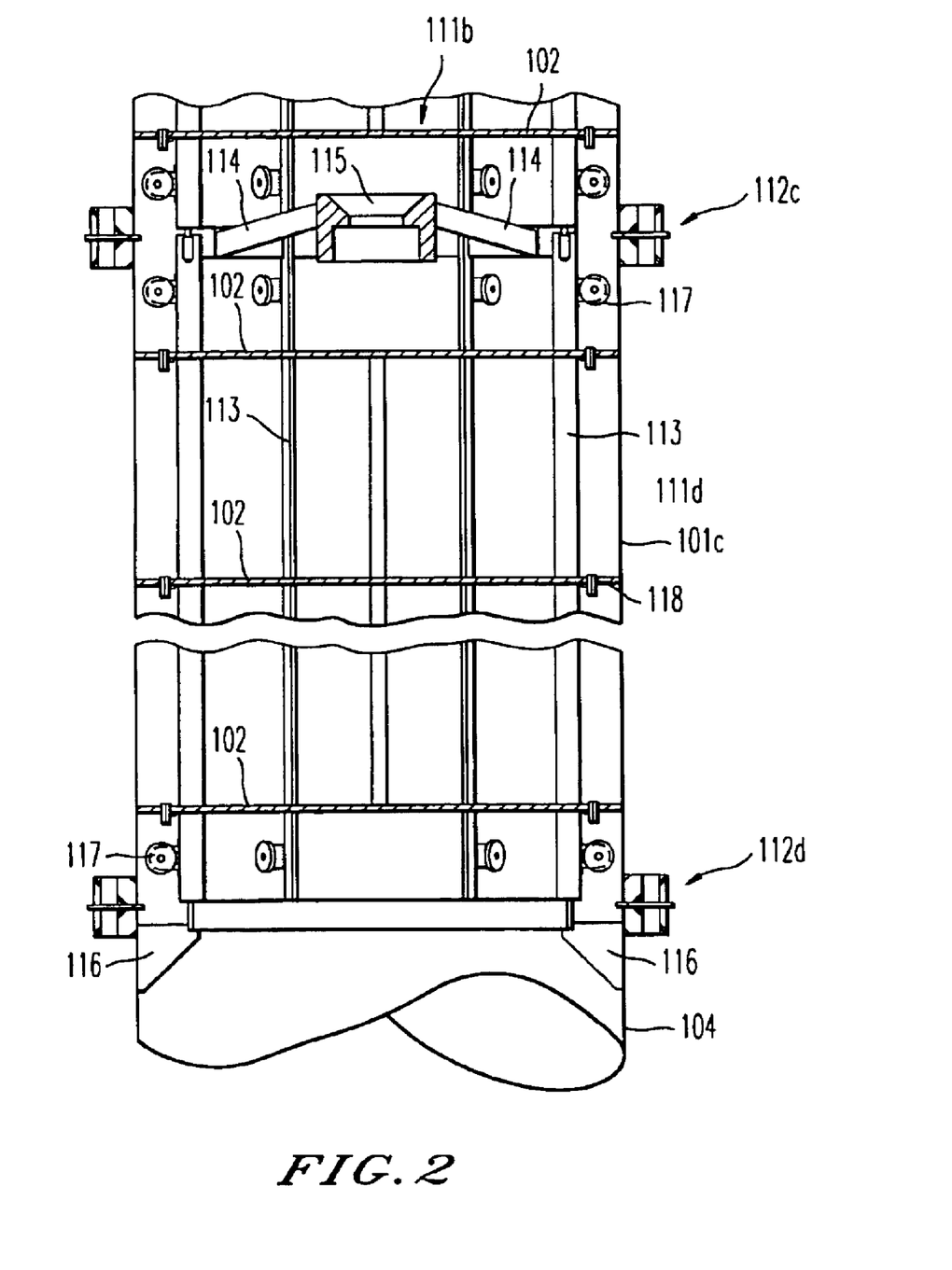
FIG. 2 shows a cutaway of the stripping pipe of FIG. 1 in lengthwise axial section with inserts inserted therein and standing one atop another.

One possible design of an insert, and the arrangement of the inserts in the column pipe 101, are now explained in more detail with reference to FIG. 2, which depicts an enlarged cutaway of the stripping pipe of FIG. 1. FIG. 2 shows the bottommost pipe section 101c with the insert 111c arranged in it. For clarity, the middle region of the pipe section 101c with the three further trays of the insert 111c is not depicted. The trays 102 of the insert 111c are welded together with six elongate metal plates 113, arranged at the external periphery of the trays, to form the insert. Arranged at the top end of the insert 111c are cross-struts 114 which run together in an adapter 115. The adapter 115 is designed such that it is able to cooperate with automatic lifting tongs, which are not shown here but are introduced into the column pipe 101 from above.

In the example depicted, the individual inserts are stacked atop one another. In FIG. 2 it can be seen that the bottommost insert 111c sits on the support port 116 which is welded to the inside of the extended bottom 104. The total length of the insert corresponds essentially to the length of the associated pipe section. The overlying insert 111b is situated on the bottommost insert 111c; in the embodiment depicted, rods provided on the lower face of the insert 111b engage in corresponding centering recesses on the top face of the insert 111c. The inserts themselves are not connected to the column pipe 101. For introducing and removing the inserts, the column top 103 is lifted and automatic lifting tongs engage in the adapter 115 of the topmost insert 111a, which is shaped like the insert 111c depicted in FIG. 2; the tongs then lift the insert 111a from the underlying insert 111b and pull it upward out of the pipe. In the same way, finally, the inserts 111b and 111c are lifted in succession from the pipe. To aid introduction and removal, the outer periphery of each insert bears a plurality of sliding elements 117 made of polytetrafluoroethylene (PTFE). There is a generally a certain play between the external periphery of the trays 102 and the internal wall of the column pipe 101. Therefore, in order to seal off the resultant space, on the external periphery of each tray 102 there is an elastic lip seal 118 which is indicated only in diagrammatic form in FIG. 2 but can be made out more clearly in the variant depicted in FIG. 5.

In the stripping pipe of the invention, if the trays become soiled, they can simply be removed and cleaned thoroughly and safely outside the pipe. Accordingly, the column pipe is of very simple design, since there is no longer any need for manholes for each tray and the numerous cleaning ports. The column pipe has a number of inspection windows 119 through which it is possible to monitor the introduction and removal of the inserts and, in operation, to monitor any possible clogging of the trays, and also a number of measuring ports and ports for removing samples. In total there are only 25 connecting ports. This also makes the cleaning of the stripping pipe substantially simpler than the cleaning of the stripping columns of the prior art. A further advantage of the simplified constructional design are the lower production costs for the stripping pipe of the invention.

In the case of three inserts, the total height of the stripping pipe 100 of FIG. 1 is about 12 m. The stripping typically takes place at temperatures of from 50 to 90° C. The embodiment depicted is also suitable for variants having two or four inserts.

Figure 3:
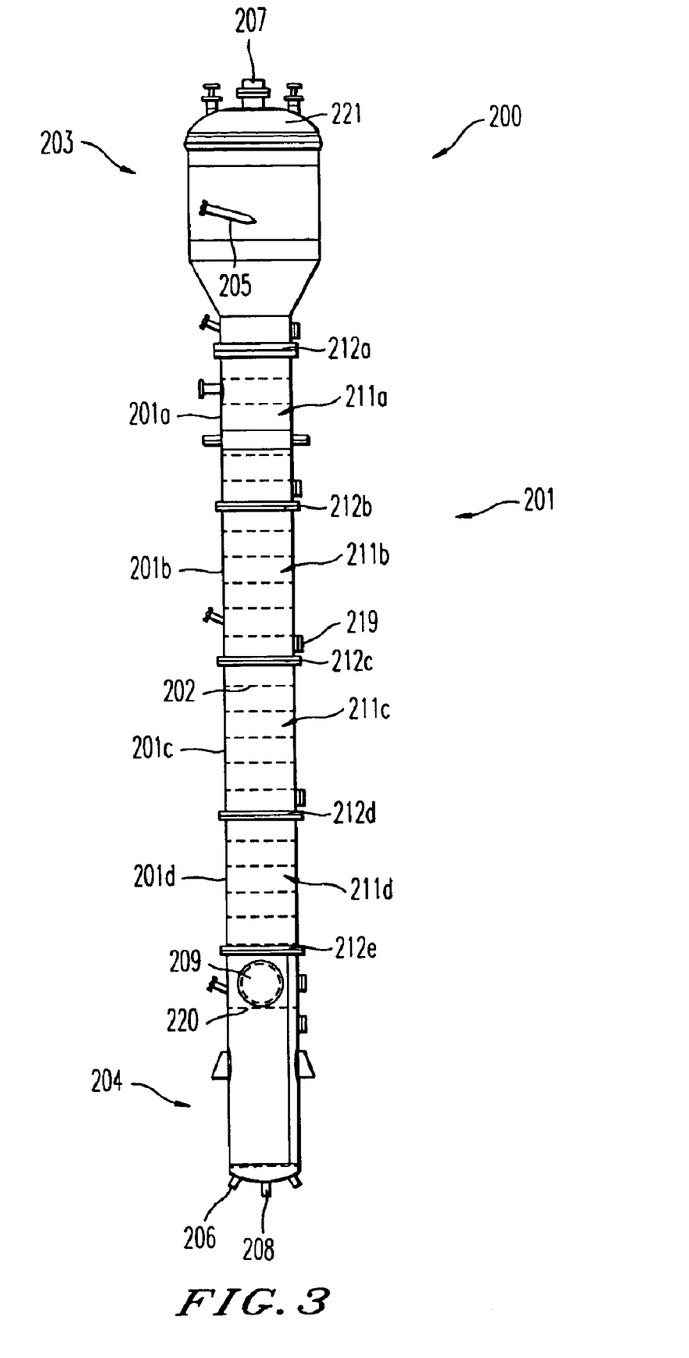
FIG. 3 shows a diagram of a second stripping pipe of the invention suitable for large batches of product.

FIG. 3 shows a second embodiment of the stripping pipe of the invention. Components which correspond to those already elucidated in connection with FIG. 1, or which fulfill the same function, are labeled with the corresponding reference numerals raised by 100, and are not elucidated in any further detail at this point. The column pipe 201 of the stripping pipe 200 of the invention is divided, in the embodiment shown, into four pipe sections 201a to 201d, which are flange-connected to one another, each pipe section containing an insert 211a–d consisting of 6 trays 202. The trays 202 of an insert are at a distance of 400 mm from one another. Arranged in the column bottom 204 is a single, firmly anchored tray 220 which is accessible by way of a manhole 209. Overall, therefore, the stripping pipe 200 has 25 trays 202. Again, the product is supplied by way of an inlet port 205 which opens tangentially into the column top 203. The product is removed by way of a central port 208 at the base of the column bottom 204. Also provided at that point, again, are connections 206 for the introduction of steam, which is taken off at the column top via the port 207.

In this embodiment, the individual pipe sections have different diameters decreasing from top to bottom. In the example depicted, the topmost pipe section 201a has a diameter of 1150 mm while the bottommost pipe section 201d has a diameter of only 1000 mm. The diameter of the column top 203 is 1800 mm and the total height of the stripping pipe is 16.2 m. Again, inspection windows 219 are provided on the individual pipe sections.

In one variant (not shown) of the stripping pipe of FIG. 3, four inserts each with six trays are provided, said trays being arranged at a distance of 600 mm and having diameters of from 1600 mm to 1450 mm. This larger stripping pipe has an overall height of about 22 m.

Figure 4:
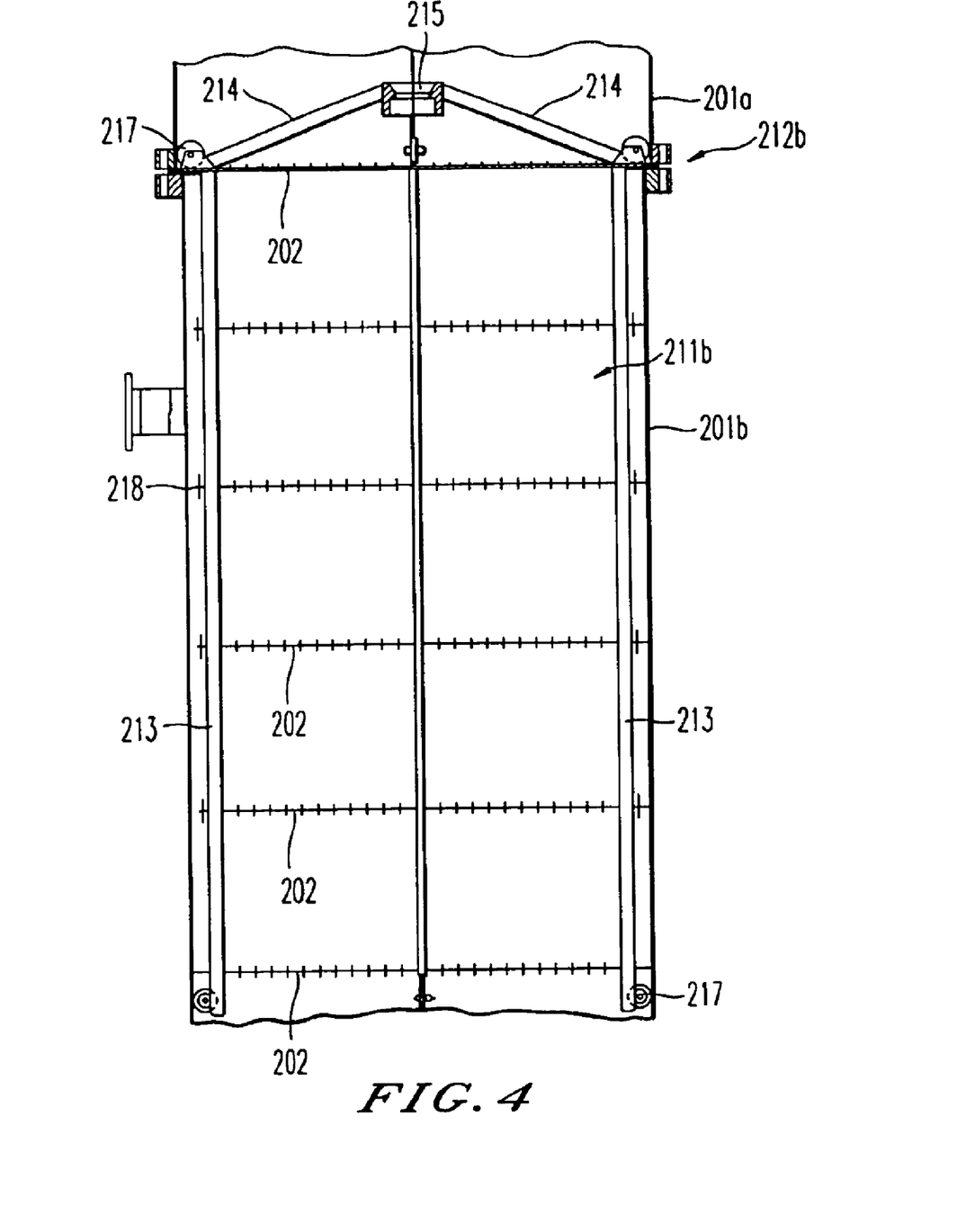
FIG. 4 shows a cutaway of the stripping pipe of FIG. 3 in lengthwise axial section with an insert lying on it.
Figure 5:
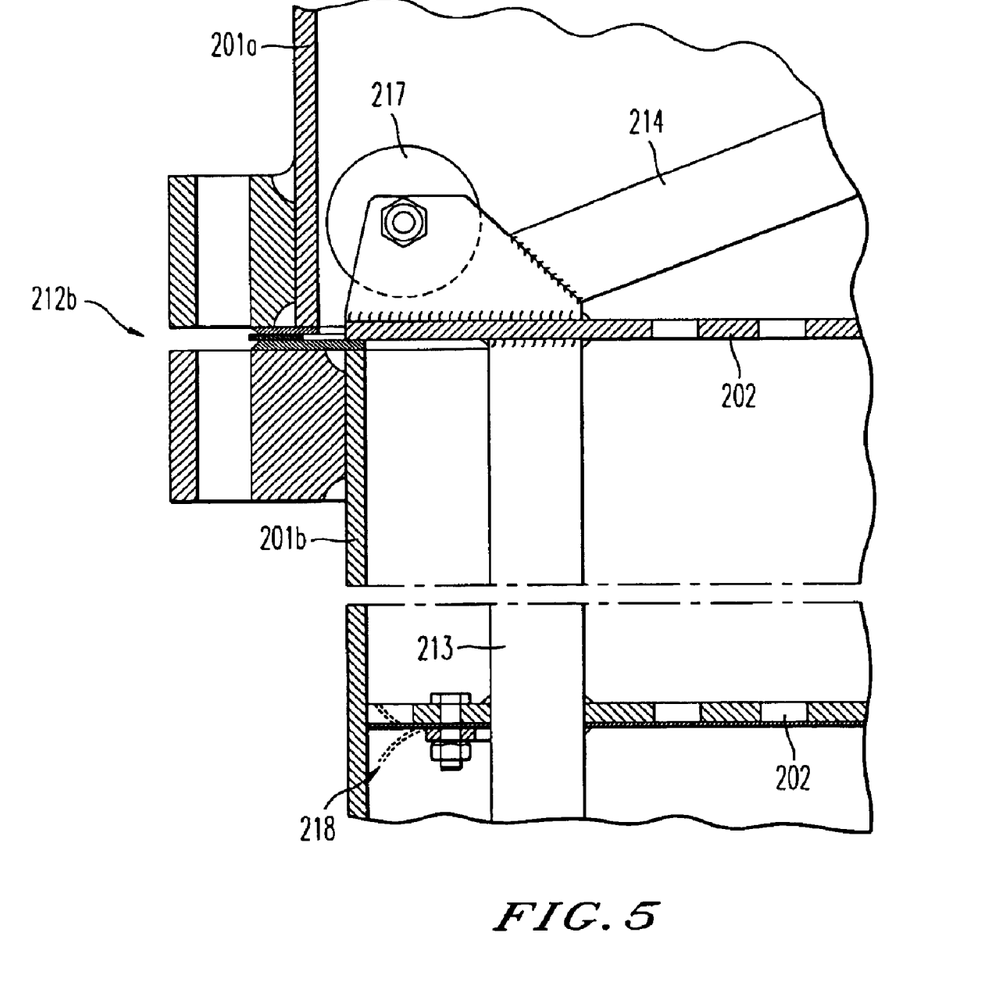
FIG. 5 shows a detail of FIG. 4, on an enlarged scale.

In contrast to the variant of FIGS. 1 and 2, the inserts 211a–211d in this second variant lie on step-shaped projections of the flange connections 212a–d, as is clear in particular from the diagram of FIG. 4 and the detailed view of FIG. 5, in which the projection formed in the region of flange 212b can be seen, the extended topmost tray 202 of the insert 211b lying on said projection. For one of the trays 202, FIG. 5 also shows in more detail the elastic lip seal 218 at the tray periphery.

By virtue of the upwardly increasing diameter of the individual pipe sections, the individual inserts can easily be removed in succession from the column pipe using lifting tongs which engage on the adapter 215. Here again, the introduction and removal of the inserts is facilitated by means of gliding elements 217 which are provided on the longitudinal profiles 213 and/or cross-profiles 214 which connect the trays of one insert. In this larger variant of the stripping pipe of the invention, it is advantageous not to remove the entire column top. Instead, the column top has an opening which can be closed by means of a removable lid 221 and through which the inserts can be removed.

Figure 6:
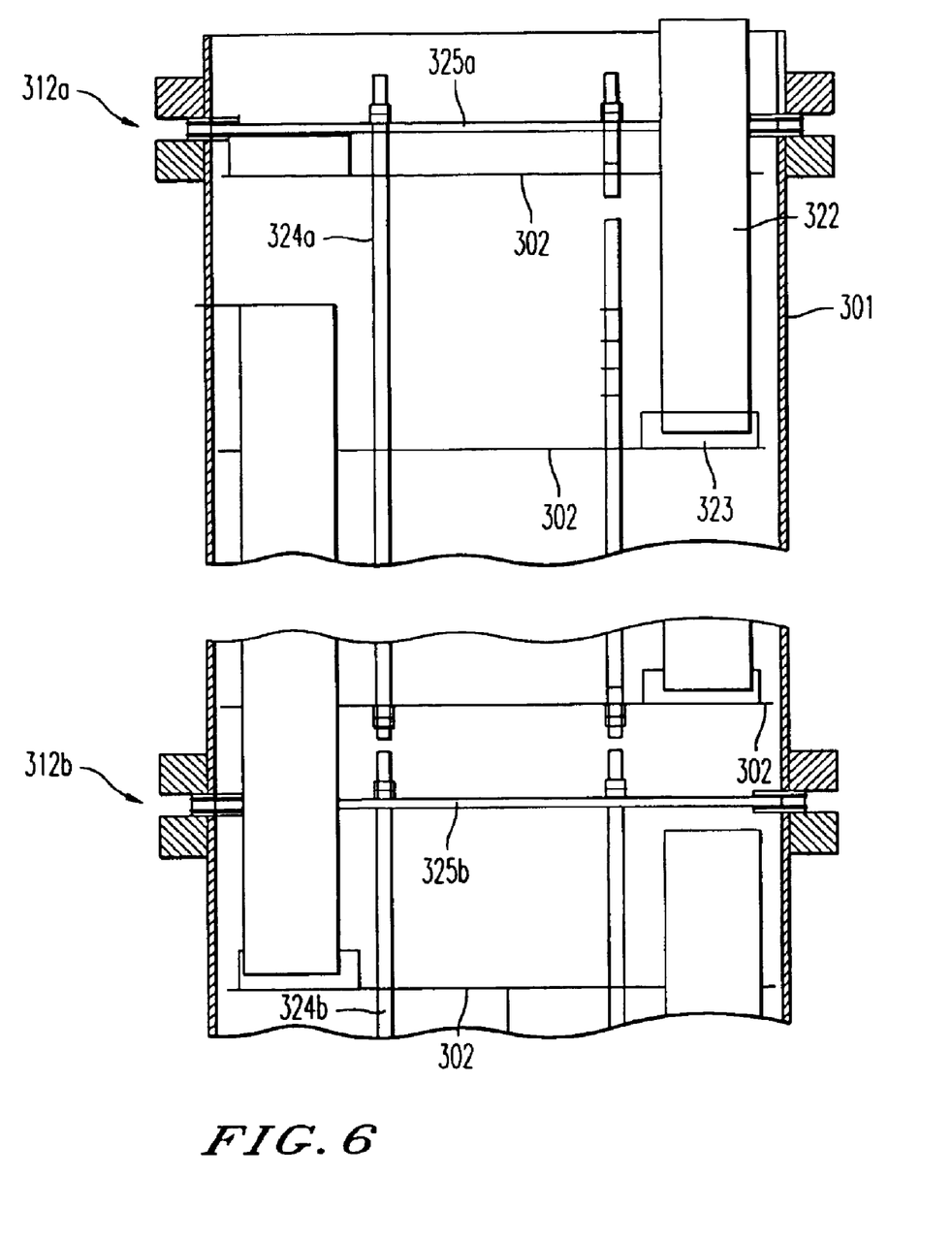
FIG. 6 shows a cutaway of a stripping pipe of the invention in lengthwise axial section, in which cross-flow trays are used instead of dual-flow trays.

In the exemplary embodiments of FIGS. 1 to 5 so far, the trays have been designed as so-called dual-flow trays. FIG. 6 now shows a variant in which a stripping pipe of the invention is provided with cross-flow trays 302. In the cutaway of the stripping pipe that is depicted, a column section 301 can be seen between two connecting flanges 312a and 312b. The column section 301 accommodates an insert consisting of a plurality of cross-flow trays 302 connected to one another. In the example depicted, the trays 302 are connected to one another by threaded rods 324a fixed by a locknut at the ends. The insert is stabilized, in addition, by means of support rings 325a running round it. An overflow shaft 322 connects each pair of cross-flow trays 302 lying one above the other. The shaft 322 opens into a pot 323 arranged on the lower tray.

FIG. 6 shows a further variant of the arrangement of an insert consisting of two or more trays in the associated column section: the support ring 325a of the insert is clamped in the flange connection 312a of two column sections. It can be seen that the upper insert does not lie directly on the lower insert held together by the rods 324b and the support ring 325b. This variant is particularly suitable for very small columns where the flange connections between the column sections can be undone quickly and the insert can be lifted from the column section. In this case too, cleaning is substantially easier than in the case of known stripping columns, since here again a complete insert, typically with six trays, can be removed in one go from the pipe.

Figure 7:
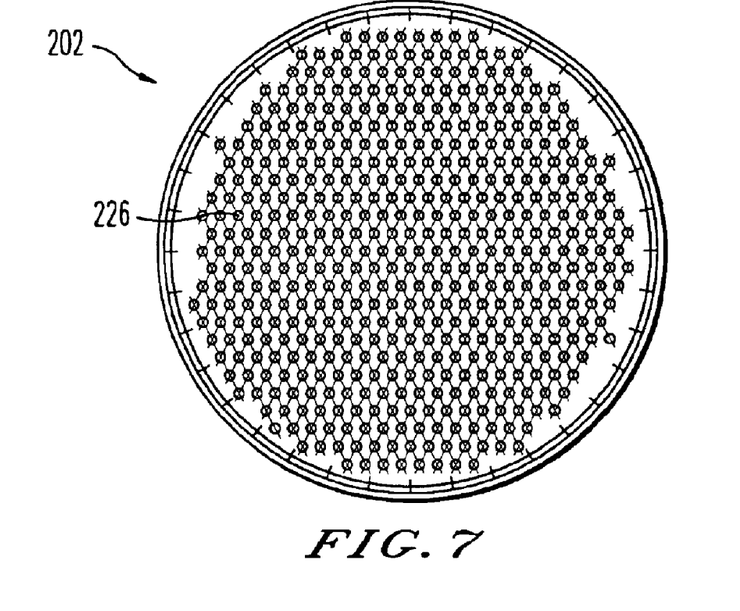
FIG. 7 shows a plan view of a dual-flow tray.
Figure 8:
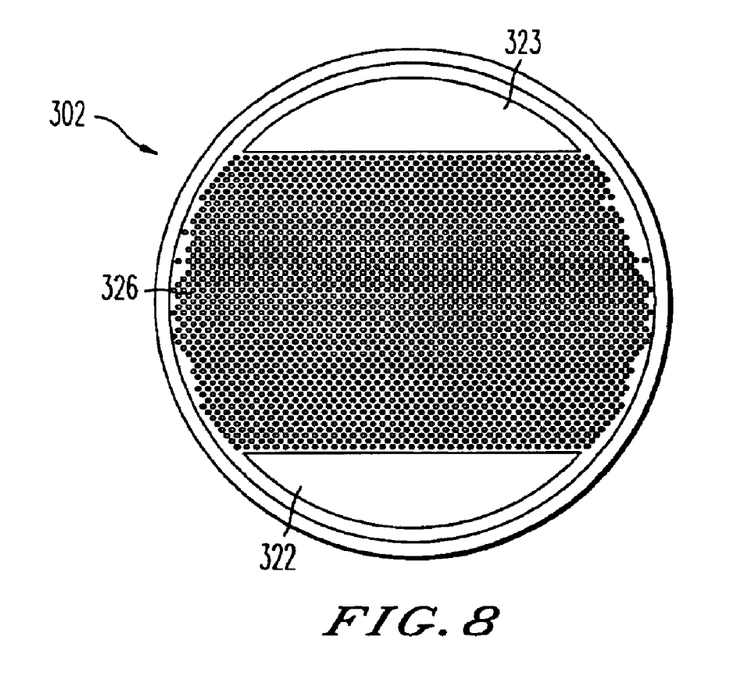
FIG. 8 shows a plan view of a cross-flow tray.

The basic design of dual-flow and cross-flow trays is depicted in FIGS. 7 and 8.

FIG. 7 shows a plan view of a dual-flow tray 202 which can be used in the apparatus of the invention. Approximately 16% of the total area of the tray is formed by about 600 holes 226 having an average diameter of from 10 to 50 mm.

For comparison, FIG. 8 shows the plan view of a cross-flow tray 326 which in its middle region possesses numerous holes 306 whose diameter is smaller than that of the holes of a dual-flow tray and is typically from 2 to 10 mm. A considerable part of the surface of the tray is accounted for by the downcomer shaft 322, which connects the tray 302 with a tray lying below it, and by a pot 323 into which the downcomer shaft of the upper tray emerges, as is evident more precisely, in particular, from the lengthwise section of FIG. 6. It can be seen that the specific throughput of such a tray is lower than that of a dual-flow tray, since in the case of the cross-flow tray the area through which gas is able to flow is lower on account of the areas occupied by the shaft and pot. Consequently, dual-flow trays are generally preferred for use in the apparatus of the invention.

The invention is elucidated in more detail by the following examples.

EXAMPLE 1

A variant of the apparatus of FIG. 1 consisted of a separator having a diameter of 1400 mm onto which two tube sections, 2800 and 3260 mm long respectively, with a nominal diameter of 500 mm had been flanged. Two inserts were installed, with five and six cross-flow trays respectively, each of which trays was at a distance of 400 mm from its neighbor. The shafts were pipes having nominal diameters of 100 mm, which projected 100 mm upward from the respective tray and extended down by 50 mm on the tray below.

These cross-flow trays were fed from the top with 2.0 t/h of an aqueous cosmetic dispersion (50 mPas) and from the bottom with 0.4 t/h of steam at 54° C. (0.15 bar) in the separator present. The intention was to deplete around 600 ppm of t-butanol from the entering dispersion. In the dispersion discharged from the countercurrent stripping pipe of the invention, t-butanol could no longer be detected by means of conventional GC analysis with a detection limit of below 10 ppm. The depletion was therefore complete.

EXAMPLE 2

In a variant of Example 1, two inserts comprising five and six dual-flow trays respectively, each of which trays were at a distance of 400 mm from its neighbor, were installed. The trays each had 103 holes with a diameter of 20 mm, which corresponded to a free hole area of 16% of the pipe cross section. The dual-flow trays were fed from the top with 3.5 t/h of dispersion and from the bottom with 0.7 t/h of steam. Here again, 600 ppm of t-butanol were likewise depleted to less than 10 ppm.

Consequently, a column stripping process is provided for even very small dispersion batches (in this case 6000 kg) which exhibits an efficiency similar to that of the large deodorizing columns used to date.

EXAMPLE 3

The apparatus of the invention is also suitable for separating the solvent from polymer solutions, i.e., for replacing it by water.

Using the apparatus of Example 1, a solution polymer in isopropanol (3270 kg of polymer, 2080 kg of isopropanol, 460 kg of water) as fed into the separator instead of the dispersion with a throughput of 1680 kg/h together with 200 kg/h of steam and was stripped with 500 kg/h of steam which was passed in at the column bottom. Following discharge from the column bottom, the stripped solution polymer contained only 650 ppm of isopropanol.

EXAMPLE 4

Using the apparatus of Example 2, the isopropanol was stripped from polymer solution fed in at 2100 kg/h, using 700 kg/h of steam, to a level of 300 ppm.

We claim:

1. A countercurrent stripping pipe for removing volatile organic constituents from reaction products, comprising:
   a column pipe composed of a plurality of pipe sections connected to one another by flange connections, in which pipe sections trays are arranged, a plurality of successive trays being connected to one another to form at least two separate inserts which can be removed from the column pipe;
   first connections for supplying and removing the reaction products; and
   second connections for supplying and removing at least one stripping agent in countercurrent to the reaction products,
   wherein internal diameters of successive pipe sections decrease from top to bottom and a removable insert is arranged in each pipe section.

2. A countercurrent stripping pipe as claimed in claim 1, wherein up to 10 inserts are arranged in the column pipe.

3. A countercurrent stripping pipe as claimed in claim 2, wherein each insert has from 3 to 10 trays.

4. A countercurrent stripping pipe as claimed in claim 2, wherein each insert has from 4 to 7 trays.

5. A countercurrent stripping pipe as claimed in claim 2, wherein each insert has 6 trays.

6. A countercurrent stripping pipe as claimed in claim 1, wherein a diameter of the trays of one insert corresponds substantially to an internal diameter of the column pipe.

7. A countercurrent stripping pipe as claimed in claim 6, wherein the diameter of the trays of the one insert is from 100 to 2500 mm.

8. A countercurrent stripping pipe as claimed in claim 6, wherein the diameter of the trays of the one insert is from 500 to 1600 mm.

9. A countercurrent stripping pipe as claimed in claim 6, wherein a distance between successive trays in an insert is from 200 to 1000 mm.

10. A countercurrent stripping pipe as claimed in claim 6, wherein a distance between successive trays in an insert is from 400 to 600 mm.

11. A countercurrent stripping pipe as claimed in claim 1, further comprising a widened column top configured to be removable.

12. A countercurrent stripping pipe as claimed in claim 1, further comprising a widened column top including an aperture which can be closed and whose diameter is configured to permit removal of the inserts.

13. A countercurrent stripping pipe as claimed in claim 1, wherein the inserts stand on top of one another in the column pipe.

14. A countercurrent stripping pipe for removing volatile organic constituents from reaction products, comprising:
   a column pipe composed of a plurality of pipe sections connected to one another by flange connections, in which pipe sections trays are arranged, a plurality of successive trays being connected to one another to form at least two separate inserts which can be removed from the column pipe;
   first connections for supplying and removing the reaction products; and
   second connections for supplying and removing at least one stripping agent in countercurrent to the reaction products,
   wherein
   internal diameters of successive pipe sections decrease from top to bottom and a removable insert is arranged in each pipe section, and the inserts lie on steplike connecting regions between each pair of successive pipe sections.

15. A countercurrent stripping pipe as claimed in claim 14, wherein up to 10 inserts are arranged in the column pipe.

16. A countercurrent stripping pipe as claimed in claim 15, wherein each insert has from 3 to 10 trays.

17. A countercurrent stripping pipe as claimed in claim 15, wherein each insert has from 4 to 7 trays.

18. A countercurrent stripping pipe as claimed in claim 14, wherein each insert has 6 trays.

19. A countercurrent stripping pipe as claimed in claim 14, wherein a diameter of the trays of one insert corresponds substantially to an internal diameter of the column pipe.

20. A countercurrent stripping pipe as claimed in claim 19, wherein the diameter of the trays of the one insert is from 100 to 2500 mm.

21. A countercurrent stripping pipe as claimed in claim 19, wherein the diameter of the trays of the one insert is from 500 to 1600 mm.

22. A countercurrent stripping pipe as claimed in claim 19, wherein a distance between successive trays in an insert is from 200 to 1000 mm.

23. A countercurrent stripping pipe as claimed in claim 19, wherein a distance between successive trays in an insert is from 400 to 600 mm.

24. A countercurrent stripping pipe as claimed in claim 14, further comprising a widened column top configured to be removable.

25. A countercurrent stripping pipe as claimed in claim 14, further comprising a widened column top including an aperture which can be closed and whose diameter is configured to permit removal of the inserts.

26. A countercurrent stripping pipe as claimed in claim 14, wherein the inserts stand on top of one another in the column pipe.

27. A method of removing volatile organic constituents from polymeric products, comprising:

feeding a polymeric product containing volatile organic constituents into the countercurrent stripping pipe as claimed in claim 1 under conditions to remove volatile organic constituents from the polymeric product.

28. A method of removing volatile organic constituents from polymeric products, comprising:

feeding a polymeric product containing volatile organic constituents into the countercurrent stripping pipe as claimed in claim 14 under conditions to remove volatile organic constituents from the polymeric product.

29. A method of replacing an organic solvent of a polymer solution with water, comprising:

feeding a polymer solution containing an organic solvent into the countercurrent stripping pipe as claimed in claim 1 under conditions to replace the organic solvent with water.

30. A method of replacing an organic solvent of a polymer solution with water, comprising:

feeding a polymer solution containing an organic solvent into the countercurrent stripping pipe as claimed in claim 14 under conditions to replace the organic solvent with water.

* * * * *